United States Patent [19]

Ishizu et al.

[11] Patent Number: 5,171,508

[45] Date of Patent: Dec. 15, 1992

[54] METHOD OF MAKING WINDOW GLASS WITH A GASKET

[75] Inventors: Tsuneo Ishizu; Shoji Atsuta, both of Aichi; Noriyuki Yoshihara, Yokohama; Toshio Ito, Tokyo, all of Japan

[73] Assignee: Asahi Glass Company Ltd., Tokyo, Japan

[21] Appl. No.: 622,480

[22] Filed: Dec. 5, 1990

[30] Foreign Application Priority Data

Dec. 5, 1989 [JP] Japan ................... 1-316294

[51] Int. Cl.⁵ ............................................. B29C 45/14
[52] U.S. Cl. .................................... 264/236; 264/252; 264/279; 264/347
[58] Field of Search ............... 264/263, 277, 274, 252, 264/236, 347, 279

[56] References Cited

U.S. PATENT DOCUMENTS

| 3,335,124 | 8/1967 | Larsen | 524/586 |
|---|---|---|---|
| 3,701,702 | 10/1972 | Shichman et al. | 264/236 |
| 4,247,510 | 1/1981 | Desverchere | 264/236 |
| 4,626,185 | 12/1986 | Monnet | 264/252 |
| 4,722,969 | 2/1988 | Huynh-Tran et al. | 525/123 |
| 4,755,339 | 7/1988 | Reilly et al. | 264/275 |
| 4,839,122 | 6/1989 | Weaver | 264/275 |

FOREIGN PATENT DOCUMENTS

| 0199372 | 10/1986 | European Pat. Off. . |
|---|---|---|
| 0333538 | 9/1989 | European Pat. Off. . |
| 1419940 | 10/1965 | France . |
| 63-27547 | 2/1988 | Japan . |
| 1122722 | 5/1989 | Japan . |
| 2072944 | 3/1990 | Japan ................... 264/236 |

OTHER PUBLICATIONS

European Search Report Against EP 90 12 3139 dated Oct. 14, 1991.

*Primary Examiner*—Jan H. Silbaugh
*Assistant Examiner*—Brian J. Eastley
*Attorney, Agent, or Firm*—Oblon, Spivak, McClelland, Maier & Neustadt

[57] ABSTRACT

A method of making window glass with a gasket, which includes closing a mold having window glass placed therein to form an inner cavity for forming a resin gasket along the periphery of the window glass, injecting a thermoplastic resin material melted at a relatively low temperature, having a low viscosity and containing a crosslinking agent, into the inner cavity, solidifying it to form a resin gasket, and crosslinking and curing the resin gasket after removal from the mold.

4 Claims, 1 Drawing Sheet

METHOD OF MAKING WINDOW GLASS WITH A GASKET

The present invention relates to a method of making window glass with a synthetic resin gasket. More particularly, it relates to a method of making window glass with a gasket which is suitable for use as window glass for automobiles or window glass for buildings.

It is common to attach a gasket, molding or frame member (hereinafter generally referred to as a gasket) made of rubber or a synthetic resin to the periphery of window glass for vehicles such as automobiles or to the periphery of window glass for buildings for the purpose of e.g. installation, decoration or sealing. For example, as shown in FIGS. 1 and 2, a gasket 2 is attached to the periphery of window glass 1.

Heretofore, for attaching such a gasket to window glass, it has been common to employ a method which comprises bonding or fitting a gasket molded by e.g. extrusion molding, along the periphery of window glass. However, in this method, a gasket formed linearly is attached while being bent to conform the shape of the periphery of the window glass. Accordingly, there has been a problem such that creases tend to form at the corner portions, or when the window glass has a complicated shape, it becomes difficult to attach the gasket. To solve such a problem, a method for producing window glass with a gasket has been proposed which comprises placing window glass in a mold, injecting into the mold a gasket-forming material such as a melt of thermoplastic resin, or a mixture of raw materials capable of forming rubber or elastomer, forming a gasket along the periphery of window glass in the mold, and taking out the molded product from the mold (see e.g. Japanese Unexamined Patent Publications No. 158481/1982, No. 73681/1983, No. 110786/1983, No. 4015/1985, No. 104412/1985, No. 63115/1985, No. 79613/1986 and No. 6645/1986). According to this method, as shown in FIG. 3, window glass 1 is set in a mold 5 comprising a first mold section 3 and a second mold section 4, and a molten thermoplastic resin or its raw material is injected into an inner cavity 6 formed in this mold 5, whereby a synthetic resin gasket as shown in FIGS. 1 and 2 is integrally formed along the periphery of window glass 1. The following two methods are well known as methods for forming such gasket.

One of them is a so-called reactive injection molding (RIM) method, wherein two types of reactants, as represented by urethane, are simultaneously injected and mixed and reacted to form a gasket in the mold.

The other is a method in which a thermoplastic resin material is heated, melted and injected into a mold, and a gasket is formed in the mold.

Among such conventional methods, the former reactive injection molding method has drawbacks such that the cost of the raw materials itself is high, and the weather resistance of the materials is poor and it is necessary to apply a coating on the product. Further, since the reaction is conducted in the mold, it takes a relatively long time before the removal from the mold, and the operation efficiency is low. Thus, this method has problems with respect to the cost and the productivity and is not much mass-productively useful.

On the other hand, the latter method in which a thermoplastic resin material such as polyvinyl chloride is employed, is widely adopted, since it has little problems with respect to the cost and the productivity. However, according to this method, a molten resin material is injected, whereby high heat and pressure are required for the injection. The heating temperature for the resin material is usually from 150° to 200° C., and the injection pressure is usually required to be from 300 to 500 kg/cm$^2$. In such a case, when the window glass 1 is placed in the mold 5, it is necessary to firmly clamp the window glass by the first mold section 3 and the second mold section 4, whereby there is a problem that the window glass 1 is likely to be broken by the clamping force. This problem is particularly remarkable when the window glass is laminated glass or double glazed glass as opposed to tempered glass. However, even with tempered glass having a high strength, such problem still occurs. In particular, even with tempered glass, if it is the one subjected to bending processing, there has been a problem of breakage of window glass. Namely, in the bending processing of glass sheet, it is usually difficult to increase the precision of the bending processing, whereby there is substantial variation in the bent shape among individual tempered window glass materials. Accordingly, when such window glass 1 is placed in the mold 5 and clamped by the first mold section 3 and the second mold section 4, a stress is exerted to the window glass 1, whereby the window glass is likely to be broken. Especially, it has been common in resent years to use window glass having a large bending rate or window glass having a complicated shape as window glass for automobiles, and with such window glass, the breakage is frequent. Thus the economical loss due to a decrease in the yield has been substantial.

Further, in a case where the window glass set in the mold is laminated glass or double glazed glass, its periphery is exposed to the heat of the injected resin material, whereby an interlayer of the laminated glass or a sealing material of the double glazed glass tends to undergo property changes or to be damaged.

In an attempt to solve such a problem, if a resin material meltable at a relatively low temperature or a resin material having good fluidity with a low viscosity when melted and thus capable of being injection molded at low pressure, is used for forming the gasket, there will be another problem such that the basic physical properties such as desired tensile strength, elongation, cold resistances and thermal deformability tend to substantially deteriorate.

The present invention has been made in view of the above mentioned problems of the conventional methods. It is an object of the present invention to provide a method of forming a synthetic resin gasket for window glass by injecting a synthetic resin material at a relatively low temperature and under a relatively low pressure to form the synthetic resin gasket so that the adverse effects to the window glass can be controlled as far as possible.

According to the present invention, the above object can be accomplished by a method of making window glass with a gasket, which comprises closing a mold having window glass placed therein to form an inner cavity for forming a resin gasket along the periphery of the window glass, injecting a thermoplastic resin material melted at a relatively low temperature, having a low viscosity and containing a crosslinking agent, into the inner cavity, solidifying it to form a resin gasket, and crosslinking and curing the resin gasket after removal from the mold.

Now, the present invention will be described in detail with reference to the preferred embodiments.

FIGS. 3, 4(a), 4(b) and 4(c) illustrate an embodiment of the method of making window glass with a gasket, whereby a synthetic resin gasket is integrally formed on a glass plate.

Now, the method of the present invention will be described step by step.

Figure 1:
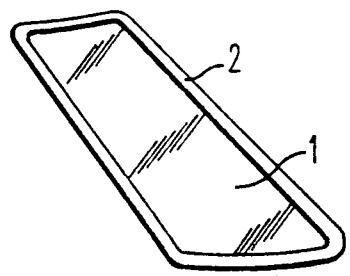
FIG. 1 is a perspective view illustrating an embodiment of the window glass with a gasket.
Figure 2:
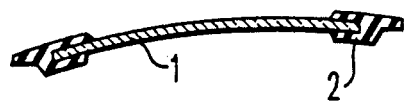
FIG. 2 is a cross sectional view of the same window glass with a gasket.
Figure 3:
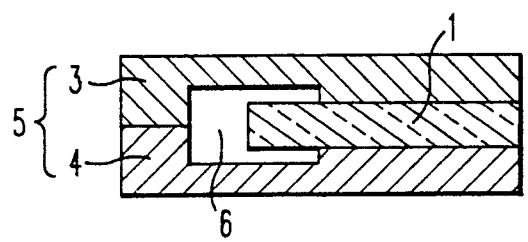
Figure 4A:
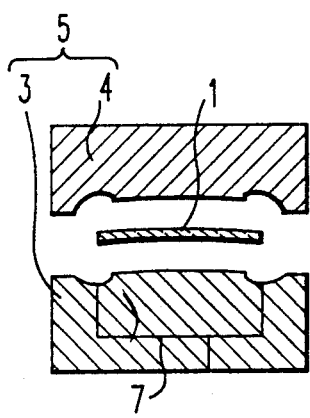
Figure 4B:
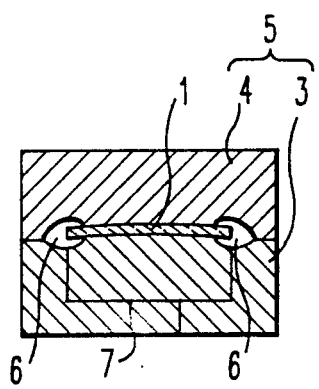
Figure 4C:
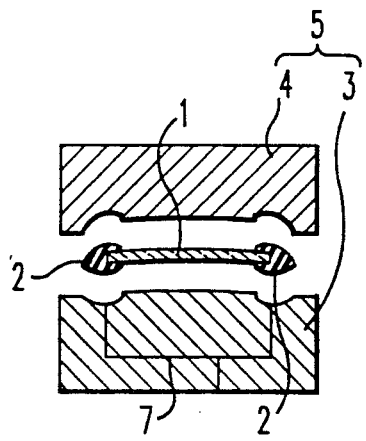

Firstly, as shown in FIG. 4(a), window glass 1 is placed in a mold comprising a first mold section 3 and a second mold section 4. Then, as shown in FIG. 4(b), the window glass 1 is clamped by the first mold section 3 and the second mold section 4 to form an inner cavity 6 along the periphery of the window glass. Then, a gasket-forming material is injected into the inner cavity 6 from a gate 7 of the mold 5. After the gasket material is solidified in the inner cavity 6, the first mold section 3 and the second mold section 6 are disassembled as shown in FIG. 4(c), and the window glass having a gasket integrally molded thereto is taken out from the mold 5. Then, this window glass with a gasket is transferred to a crosslinking and curing step, whereby the integrally formed gasket is crosslinked and further cured.

The present invention can be applied to window glass of various structures including tempered glass, tempered bending glass, laminated glass, double glazed glass and usual glass plates. Particularly, it is thereby possible to efficiently and inexpensively form a gasket to a laminated glass or double glazed glass, to which it has been difficult to form a gasket when using the RIM method since the strength of such glass is inadequate. And such window glass having a gasket is useful as window glass for automobiles, window glass for architectural use, door glass for freezer show cases as well as window glass for various vehicles such as vehicles, vehicles for industrial use and vehicles for railways.

Further in the case of window glass for automobiles or for other vehicles, it may be attached not only as windshields for vehicles but also as window panes at various locations of the vehicles such as side windows, roof windows and rear windows.

On the other hand, in the present invention, as the mold in which window glass is set and then a synthetic resin material is injected, a mold made of a metal such as stainless steel or iron, may be used. Further, as the injection can be conducted under a relatively low pressure and heat as compared with conventional methods, it is also possible to employ a mold made of a hard resin, when the number of products to be prepared is relatively small.

As the resin material to be used in the present invention, it is preferred to employ a resin material which is thermoplastic and has a melt viscosity to permit injection at a relatively low temperature under a low pressure and yet can readily be crosslinked and cured by application of various energy such as light, heat or radiation after the injection molding and the cured product of which exhibits practical basic physical properties including the minimum required tensile strength, elongation, the cold resistance and weather resistance as the gasket.

As the resin material which satisfies such various conditions, it is possible to employ a thermoplastic resin of a polyolefin type such as polyethylene or polypropylene, or a thermoplastic resin of a chlorine-containing polymer compound type such as polyvinyl chloride. It is preferred to employ polyvinyl chloride particularly from the viewpoint of the cost, weather resistance and fluidity. It is especially preferred to select a thermoplastic resin which provides adequate fluidity for injection molding at a temperature of from 120° to 200° C.

With respect to the apparent viscosity of the molten thermoplastic resin material to be injected into the inner cavity of the mold, it is necessary to secure the fluidity sufficient for injection molding under a low pressure. Accordingly, the apparent viscosity is preferably at most 300 poise, more preferably at most 100 poise.

Further, in the present invention, the injection pressure for the injection molding is preferably at most 150 kg cm$^2$ more preferably from 15 kg/cm$^2$ to 130 kg/cm$^2$.

Further, in the present invention, the average degree of polymerization of a thermoplastic resin material such as a polyvinyl chloride is preferably from 200 to 700.

Further, it is necessary to impart to such resin material prescribed physical properties so that it is practically useful as gasket material. For this purpose, it is advisable to incorporate necessary additives such as a plasticizer, a heat stabilizer, an ultraviolet absorber, a photo stabilizer, etc. Specifically, as an additive for a soft vinyl chloride compound used as a window molding for automobiles, a heat stabilizer of barium type or zinc type such as a barium salt or a zinc salt of a higher fatty acid, or an ultraviolet absorber of benzotriazole type may, for example, be employed.

Such resin material is required to be crosslinked by applying an energy such as heat, light, or radiation after the molding, and a suitable crosslinking agent is incorporated. As such crosslinking agent, a polyfunctional monomer such as trimethylolpropane trimethacrylate, trimethoxyethoxy vinylsilane or triazine dithiol may, for example, be employed, when the resin material is polyvinyl chloride.

As the crosslinking method in the present invention, a commonly known method for crosslinking a linear polymer, i.e. the one capable of applying an energy such as heat, light, electron beams or radiation to the molded gasket, may be employed without any particular restriction. For example, when the resin material is polyvinyl chloride, adequate crosslinking can be conducted by heating at a temperature of from 120° to 150° C. for 10 minutes, or by radiation at a dose of from 3 to 10 Mrad. By such crosslinking, the physical properties which are inadequate for a gasket can be improved to the desired levels for a gasket.

With such a construction, according to the present invention, a thermoplastic resin material can be injected into an inner cavity formed in the mold even under an injection pressure of not higher than 150 kg/cm$^2$ to mold a gasket of a desired shape. Accordingly, even in the case of laminated glass or double glazed glass with its strength as low as usual sheet glass as is different from tempered glass, a gasket can be formed without breakage of glass due to the clamping pressure of the mold or due to the heat or pressure during the injection molding and without modification or damage of the interlayer of the laminated glass or of the sealing material of the double glazed glass. Heretofore, it has been impossible to impart basic physical properties such as necessary tensile strength and elongation, cold resistance and weather resistance to the gasket formed by the above technique. Whereas, according to the present invention, the physical properties can be improved by applying either one of energies such as light, heat, electron beams or radiation, to the crosslinking agent contained in the gasket and it is thereby possible to form a gasket having practical product quality and performance.

Now, the present invention will be described in further detail with reference to Examples. However, it should be understood that the present invention is by no means restricted by such specific Examples.

As an example of the present invention, a synthetic resin gasket is integrally formed along the periphery of the window glass under the following conditions.

EXAMPLE 1

As window glass, laminated glass was placed in a mold made of iron, and into the inner cavity, a thermoplastic resin material composed of a polyvinyl chloride resin having an average degree of polymerization of 300 and containing 6-dibutylamino-1,3,5-tirazine-2,4-dithiol as a crosslinking agent, was injected under an injection pressure of 100 kg/cm$^2$ at a temperature of 160° C. and at an apparent viscosity of 100 pois, whereby a synthetic resin gasket having a predetermined shape was integrally formed along the periphery of the laminated glass. Then, the gasket was crosslinked and cured in an atmosphere at a temperature of 140° C. for 10 minutes to obtain a resin gasket which was designated as Product 1.

EXAMPLE 2

As window glass, laminated glass was placed in a mold made of iron, and into the inner cavity, a thermoplastic resin material composed of a polyvinyl chloride resin having an average degree of polymerization of 350 and containing an epoxy-modified plasticizer as a crosslinking agent was injected under an injection pressure of 100 kg/cm$^2$ at a temperature of 150° C. and an apparent viscosity of 100 pois, whereby a synthetic resin gasket was integrally formed along the laminated glass. After removal from the mold, ultraviolet rays were irradiated to the synthetic resin gasket for 5 minutes to crosslink and cure the gasket, whereupon this resin gasket was designated as Product 2.

EXAMPLE 3

As window glass, double glazed glass was placed in a mold made of a glass fiber-reinforced epoxy resin, and into the inner cavity, a thermoplastic resin material composed a polyvinyl chloride resin having an average degree of polymerization of 400 and containing trimethylolpropane trimethacrylate as a crosslinking agent, was injected under an injection pressure 100 kg/cm$^2$ at a temperature of 150° C. and at an apparent viscosity of 100 pois, whereby a synthetic resin gasket was integrally formed along the periphery of the double glazed glass. After removal from the mold, a radiation at a dose of 10 Mrad was applied to the synthetic resin gasket, whereby the gasket was crosslinked and cured, and the resin gasket was designated as Product 3.

COMPARATIVE EXAMPLE 1

As window glass, laminated glass was placed in a mold made of iron, and into the inner cavity, a thermoplastic resin material composed a polyvinyl chloride resin having an average degree of polymerization of 400 was injected under an injection pressure of 100 kg/cm$^2$ at a temperature of 185° C. to integrally form a resin gasket along the periphery of the laminated glass. After removal from the mold, the resin gasket was designated as Comparative Product 1.

COMPARATIVE EXAMPLE 2

As window glass, laminated glass was placed in a mold made of iron, and into the inner cavity, a thermoplastic resin material composed of a polyvinyl chloride resin having an average degree of polymerization of 1,000 was injected under an injection pressure of 400 kg cm$^2$ to integrally form a resin gasket along the periphery of the laminated glass. The resin gasket after removal from the mold was designated as Comparative Product 2.

With respect to the products of the above Examples and Comparative Examples, various tests were conducted, and the results are shown in Table 1.

TABLE 1

|  | Tensile strength kgf/mm$^2$ | Elongation % | *1 Heat deformation % | *2 Weather resistance | *3 Moldability |
| --- | --- | --- | --- | --- | --- |
| Product 1 | 1.15 | 320 | 8 | ◯ | ◯ |
| Product 2 | 1.07 | 250 | 5 | ◯ | ◯ |
| Product 3 | 1.20 | 200 | 3 | ◯ | ◯ |
| Product 4 | 0.30 | 180 | 60 | X | ◯ |
| Product 5 | 1.30 | 400 | 23 | ◯ | X |

*1 JIS K 6723
*2 S-W-O-M B. P. 83° C. 2000 hrs
No substantial color change or cracks observed ◯
Remarkable color change or apperance change observed X
*3 No breakage of glass observed ◯
Breakage of glass observed X From the above Table, it has been confirmed that according to the present invention, it is possible to form a resin gasket having adequate practical properties integrally with window glass.

As described in the foregoing, according to the present invention, the resin material can be melted at a relatively low temperature for injection and its melt viscosity is relatively low, whereby injection can be conducted under low pressure as compared with the conventional methods. Therefore, it can be injected into the inner cavity with no substantial adverse effect to the window glass such as breakage of the window glass or modifying an inter layer or sealing material in the case of laminated glass or double glazing glass, and it is possible to form a resin gasket integrally along the periphery of the window glass. Besides, after removal from the mold, the molded gasket can be crosslinked and cured by virtue of the crosslinking agent contained in the resin material, whereby it is possible to impart desired practical properties and quality.

We claim:

1. A method of making window glass with a gasket, which comprises closing a mold having window glass placed therein to form an inner cavity for forming a resin gasket along the periphery of the window glass, injecting a thermoplastic resin material, wherein the thermoplastic resin material is a polyolefin or a chlorine-containing polymer compound, melted at a relatively low temperature, having an apparent viscosity of at most 300 poise and containing a crosslinking agent, into the inner cavity under an injection pressure of at most 150 kg/cm$^2$, solidifying it to form a resin gasket, and then crosslinking and curing the resin gasket after removal from the mold.

2. The method of making window glass with a gasket according to claim 1, wherein the crosslinking agent contained in the thermoplastic resin material is a polyfunctional compound having at least two carboxyl groups, mercapto groups or aromatic hydroxyl groups.

3. The method of making window glass with a gasket according to claim 1, wherein the thermoplastic resin material contains a polyfunctional compound having at least two carboxyl groups, mercapto groups or aromatic hydroxyl groups, as the crosslinking agent.

4. The method of making window glass with a gasket according to claim 1, wherein a polyvinyl chloride containing at least one polyfunctional monomer selected from the group consisting of trimethylolpropane trimethacrylate, trimethoxyethoxy vinylsilane and tirazine dithiol, as the crosslinking agent, is employed as the thermoplastic resin material.

* * * * *